United States Patent
Kaneda et al.

(10) Patent No.: US 8,723,842 B2
(45) Date of Patent: May 13, 2014

(54) POSITION POINTING DEVICE AND HAND-HELD ELECTRONIC APPLIANCE

(75) Inventors: Takenori Kaneda, Tochigi-ken (JP); Yasuyuki Fukushima, Saitama-ken (JP); Hiroyuki Fujitsuka, Saitama-ken (JP); Ian Scholey, Cambridgeshire (GB)

(73) Assignee: Wacom Co., Ltd, Saitama-Ken (JP)

( * ) Notice: Subject to any disclaimer, the term of this patent is extended or adjusted under 35 U.S.C. 154(b) by 945 days.

(21) Appl. No.: 11/885,401

(22) PCT Filed: Jan. 3, 2005

(86) PCT No.: PCT/EP2005/002173
§ 371 (c)(1),
(2), (4) Date: Nov. 2, 2009

(87) PCT Pub. No.: WO2006/092154
PCT Pub. Date: Sep. 8, 2006

(65) Prior Publication Data
US 2010/0038152 A1 Feb. 18, 2010

(51) Int. Cl.
*G06F 3/03545* (2013.01)
*G06F 3/033* (2013.01)

(52) U.S. Cl.
USPC ............. 345/179; 178/18.07; 178/19.03

(58) Field of Classification Search
CPC ..... G06F 3/046; G06F 3/033; G06F 3/03545; G06F 3/041; G06F 3/04883

USPC ............. 345/179; 178/18.01–20.04
See application file for complete search history.

(56) References Cited

U.S. PATENT DOCUMENTS

| | | | | |
|---|---|---|---|---|
| 4,263,592 | A | * | 4/1981 | Takahashi et al. ............ 345/180 |
| 4,667,182 | A | * | 5/1987 | Murphy ..................... 340/407.2 |
| 5,461,204 | A | * | 10/1995 | Makinwa et al. ........... 178/19.03 |
| 5,576,502 | A | * | 11/1996 | Fukushima et al. ....... 73/862.68 |
| 5,635,684 | A | * | 6/1997 | Fukuzaki ................... 178/18.07 |
| 5,821,916 | A | * | 10/1998 | Watson et al. ................ 345/673 |
| 5,895,895 | A | * | 4/1999 | Ono et al. .................. 178/19.03 |
| 5,988,832 | A | * | 11/1999 | Chen ............................ 362/259 |
| 6,545,577 | B2 | * | 4/2003 | Yap .............................. 335/205 |
| 6,744,426 | B1 | * | 6/2004 | Okamoto et al. ............ 345/179 |
| 6,999,067 | B2 | * | 2/2006 | Chao et al. .................. 345/179 |

FOREIGN PATENT DOCUMENTS

| EP | 0 747852 B1 | | 8/1995 |
|---|---|---|---|
| JP | 60-156131 | * | 8/1985 |
| JP | 09/230988 | | 5/1997 |
| JP | 09-230988 | * | 9/1997 |

* cited by examiner

*Primary Examiner* — Kenneth Bukowski
(74) *Attorney, Agent, or Firm* — Berenato & White, LLC

(57) ABSTRACT

The present invention relates to a position pointing device comprising a housing (12) for receiving a circuit (28), the circuit having a coil member (18, 20) and a circuit component (10), the coil member having a return wire (32) for forming the circuit, the housing having an inner surface, the inner surface having a groove (30) for receiving at least a portion of the return wire.

8 Claims, 7 Drawing Sheets

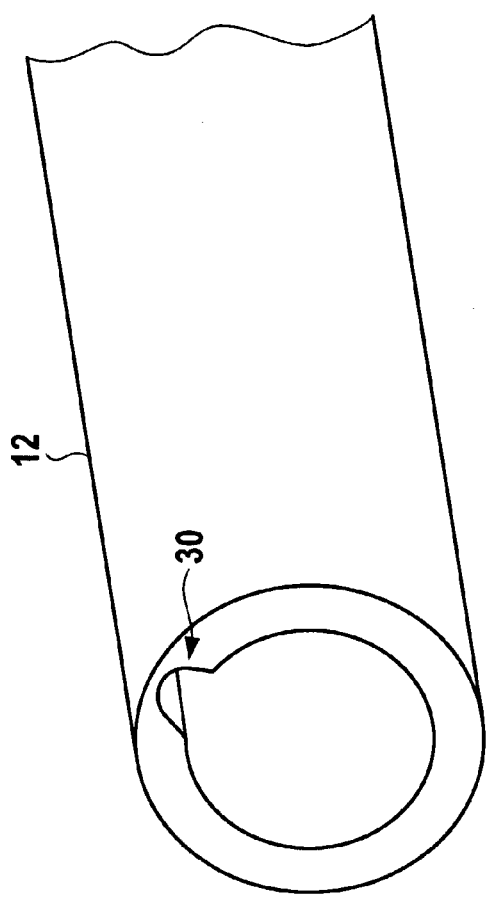
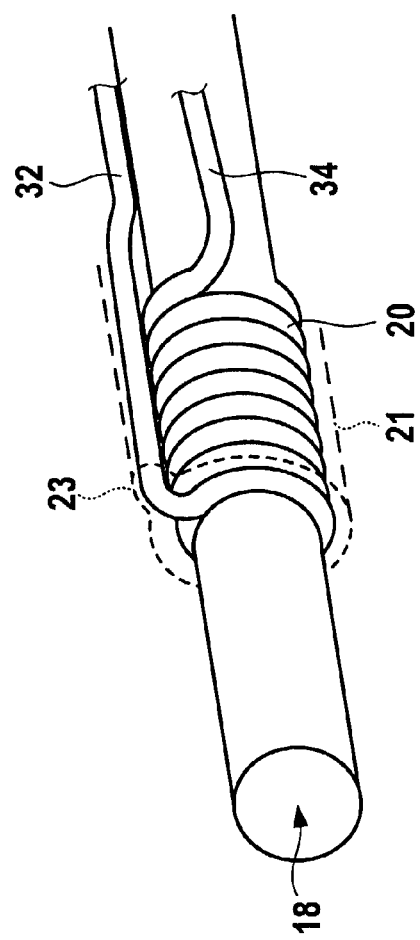

POSITION POINTING DEVICE AND HAND-HELD ELECTRONIC APPLIANCE

CROSS-REFERENCE TO RELATED APPLICATIONS AND CLAIM TO PRIORITY

This application relates is the national stage under 35 U.S.C. §371 of International Application No. PCT/EP2005/002173 filed Mar. 1, 2005, the disclosure of which is incorporated herein by reference and to which priority is claimed.

FIELD OF THE INVENTION

The present invention relates to the field of position detection and coordinate input systems, and more particularly to hand-held electronic appliances, such as mobile phones, smartphones, personal digital assistants (PDAs), navigation systems, electronic cameras, digital photo viewers and multipurpose hand-held electronic appliances.

BACKGROUND AND PRIOR ART

Various position sensor technologies are known from the prior art including resistive and capacitive touch-screens and inductive position sensors.

EP0259894 B1 shows an inductive position detecting apparatus having a plurality of loop coils for sending and receiving electromagnetic signals and a position pointer having a tuning circuit. The position detection is performed by electromagnetic coupling. Similar inductive position sensing devices are known from, e.g. EP0307667 B1; U.S. Pat. Nos. 5,565,632; 5,576,502; 5,977,959; 6,801,192 B2; 6,485,306 B1; 5,600,105; 6,667,740 B2 and US Patent Application 2001 0050556 A1.

Various capacitive pen entry position sensors are known from U.S. Pat. Nos. 5,488,204; 5,942,733 and 6,380,929.

Hand-held electronic appliances which include an entry pen for a user's entry of commands or data are known from the prior art. U.S. Pat. No. 6,667,740 B2 shows a hand-held personal digital assistant which includes a digitizing system behind the PDA's liquid crystal display which can sense the position of a resonant stylus. Further, a mobile telephone is disclosed that has a liquid crystal display, and sensor windings and excitation windings of a digitizing system under the display. The digitizing system is operable to sense the position of the resonant stylus relative to the display. The digitizing system of the mobile telephone may be used to allow a user to create short text messages which can then be sent by the mobile telephone to another party. If the mobile telephone includes an organizer then the digitizer can be used to control the inputting, manipulation and outputting of data from the organizer.

The present invention aims to provide an improved position pointing device for use with a position detection apparatus, such as a coordinate input apparatus and a hand-held electronic appliance.

SUMMARY OF THE INVENTION

In accordance with the present invention there is provided a position pointing device comprising a housing for receiving a circuit, the circuit having a coil member and a circuit component, the coil member having a return wire for forming a connection with the circuit component, the housing having an inner surface, the inner surface having a groove for receiving at least a portion of the return wire.

The present invention is particularly advantageous as it facilitates to reduce the diameter of a position pointing device. This is due to the fact that the housing of the position pointing device has a groove for receiving the return wire of the coil member. This is in contrast to prior art coil members used in prior art position pointing devices which are usually encapsulated in a ceramic or plastic tube which is then inserted into the housing. The present invention avoids a need for a ceramic or plastic tube encapsulating the coil member as the return wire is received in the groove.

However, the present is also advantageous if a coil member that is encapsulated in a ceramic or plastic tube is used. In this instance the tube has a protrusion that accommodates the return wire of the coil member. At least a portion of the protrusion is received in the groove. This facilitates the design of thin entry pens that have a tube for accommodating the coil member.

In accordance with an embodiment of the invention the circuit component is or has a capacitor such that a resonant circuit is formed. This has the advantage that a battery for powering the position pointing device might not be required as the electrical energy required for operation of the position pointing device is received by electromagnetic coupling from the transmission coil unit of the position detecting apparatus, e.g. from the excitation coils of a tablet.

In accordance with an embodiment of the invention the circuit component is or has a battery. The battery can be of any battery type, such as a rechargeable battery or a dry battery. In this instance a resonant circuit might not be required as the battery can provide the power for operation of the position pointing device.

In accordance with an embodiment of the invention the position pointing device is pen shaped. Alternatively the position pointing device is puck-shaped. The puck-shaped position pointing device can have a thumb strap for attaching the position pointing device to a user's thumb or finger.

In another aspect the present invention relates to a hand-held electronic appliance comprising a position detecting apparatus, a position pointing device for use with the position detecting apparatus having a housing for receiving a circuit, the circuit having a coil member and a circuit component, the coil member having a return wire for forming a connection with the circuit component, the housing having an inner surface, the inner surface having a groove for receiving at least a portion of the return wire, means for releaseably attaching the position pointing device to the hand-held electronic appliance.

In accordance with an embodiment of the invention the groove extends along the length axis of the housing. Alternatively the groove can enclose an angle with the length axis depending on the direction of the return wire.

In accordance with an embodiment of the invention the groove extends from a first location to an end location of the housing. This facilitates the insertion of the coil member into the housing of the position pointing device and in particular the positioning of the return wire in the groove.

In accordance with an embodiment of the invention the position pointing device has a displaceable pen tip for changing a resonant frequency and/or the inductance of the coil member. This way pressure information or other kinds of information can be entered.

In accordance with an embodiment of the invention the coil member has between 250 and 500 windings. Preferably, the coil member has a rod of ferrite material having a diameter of between 0.5 mm and 2 mm, preferably between 1 mm and 1.5 mm. The groove that is formed in the housing of the position pointing device for receiving the return wire preferably has a depth of between 0.05 mm and 1 mm, preferably between 0.1 mm and 0.5 mm.

In accordance with an embodiment of the invention the hand-held electronic appliance has a clip or a reception hole for releaseably attaching the position pointing device.

In accordance with an embodiment of the invention the hand-held electronic appliance has a display unit. Transmission and/or reception windings for emitting and receiving electromagnetic return radiation from the position pointing device are arranged behind the display.

As the present invention enables to reduce the diameter of a position pointing device it does also facilitate a more compact design of a hand-held electronic appliance to which the position pointing device can be attached.

This is particularly important for hand-held electronic appliances, such as mobile phones, smartphones, personal digital assistants, navigation systems, electronic cameras, digital photo viewers and multi-purpose hand-held electronic appliances.

BRIEF DESCRIPTION OF THE DRAWINGS

Preferred embodiments of the present invention will be described in greater detail by way of example only making reference to the drawings in which:

FIG. 3 is a schematic perspective view of a housing of a position pointing device having a groove for receiving a return wire, FIG. 4 is a schematic perspective view of a coil member.

DETAILED DESCRIPTION

Figure 1:
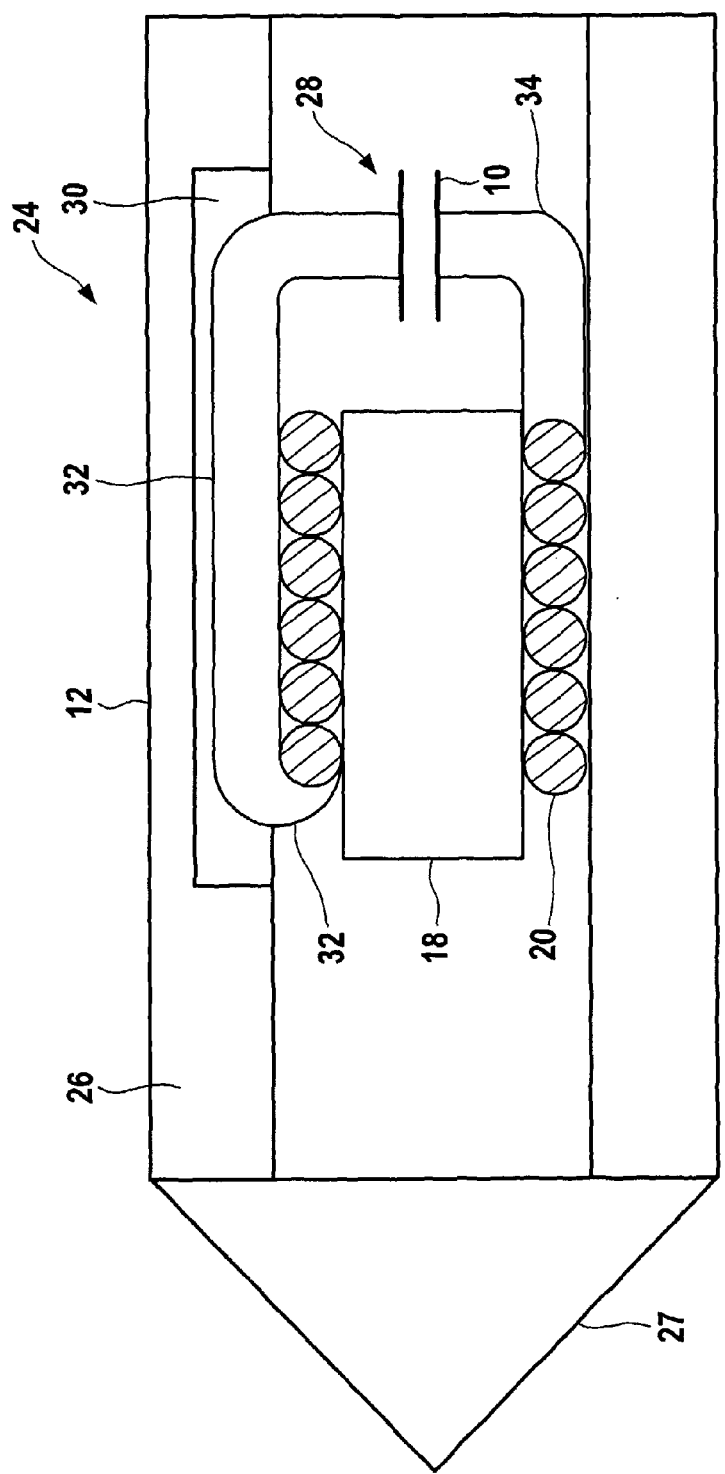
FIG. 1 is a schematic side-sectional view of a first embodiment of a position pointing device.

Throughout the following description of the preferred embodiments the same reference numerals will be used to designate like elements in the drawings.

FIG. 1 shows an entry pen 24 that has housing or casing 12 having a substantially cylindrical outer body. The housing 12 has a lower end for receiving pen tip 27.

The housing 12 has a housing wall 26 that encloses a hollow space for receiving a circuit 28. A groove 30 is formed in the housing wall 26. The depth of the groove 30 is approximately 0.2 to 0.3 mm in the preferred embodiment considered here. The groove 30 extends along the length axis of the entry pen 24 or it is oblique to the length axis.

The circuit 28 has a magnetic body such as a ferrite rod 18 with a number of coil windings 20. The ferrite rod 18 with the coil windings 20 forms a coil member. For example, there are a number of 300 to 400 coil windings 200 on ferrite rod 18. The coil member has a return wire 32 for forming an electrical connection between the lower end of the coil member, i.e. the last winding 20, and a circuit component 10. The upper end of the coil member, i.e. the first winding 20, is electrically connected to the circuit component 10 by means of wire 34.

The portion of the return wire 32 that runs along the length axis of the housing 12 is received in the groove 30. As a consequence the diameter of the entry pen 24 can be reduced correspondingly.

The circuit component 10 can be a capacitor as depicted in the FIG. 1. In this instance the circuit is a resonant circuit and a battery for powering the circuit is not required. Alternatively or in addition the circuit component 10 is a battery that serves to power the internal circuitry of the entry pen 24.

The internal circuitry can comprise other electrical or electronic components and/or an analogue or digital integrated circuit. The return wire 32 of the coil member can be directly connected to the circuit component 10 or through the intermediary of other circuit components.

In the preferred embodiment considered here the position pointing device, the entry pen 24, is pen shared. It is to be noted that the invention can also be applied for other designs, such as puck-shaped housings.

Figure 2:
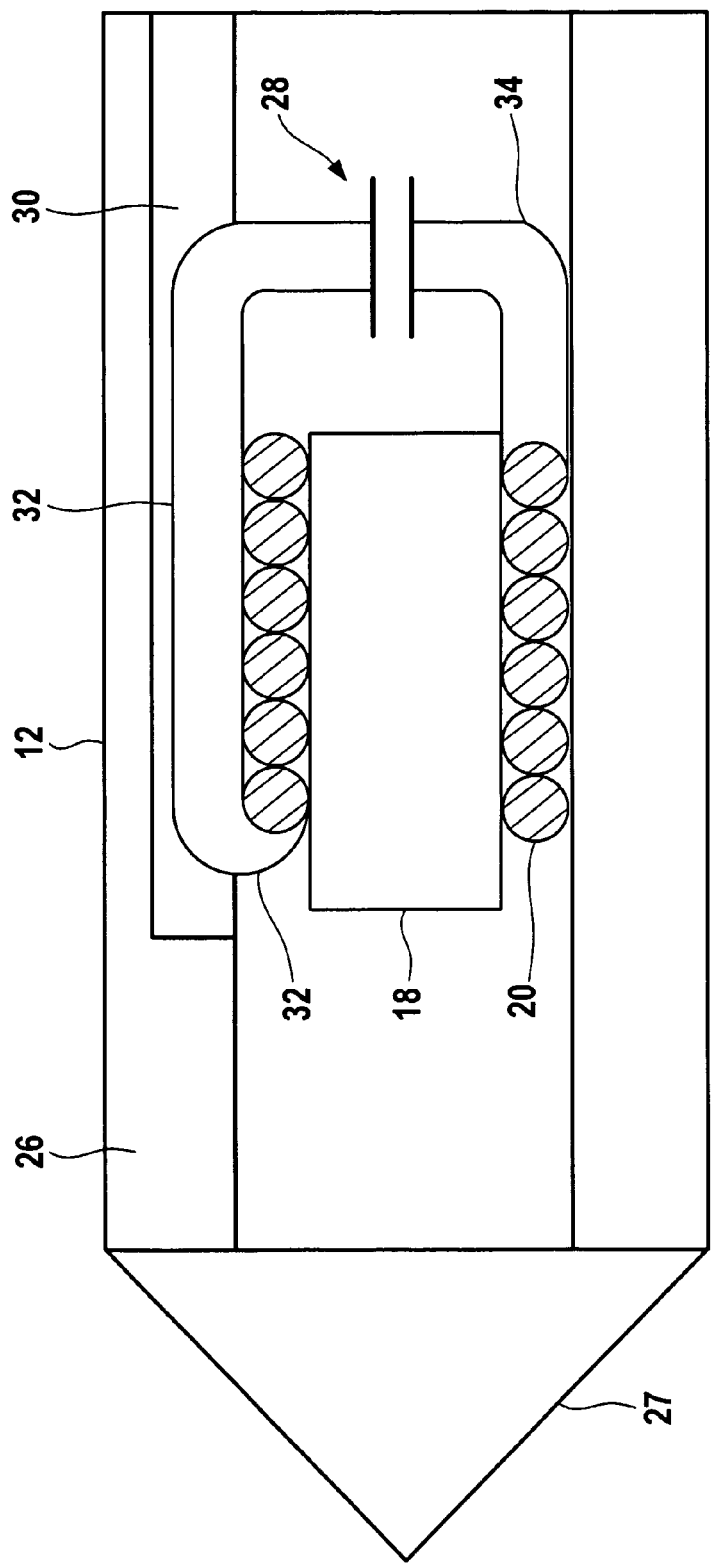
FIG. 2 is a schematic cross-sectional view of a second embodiment of a position pointing device.

FIG. 2 shows an alternative embodiment of the entry pen 24. In the embodiment considered here the groove 30 extends to the upper end of the housing 12. This facilitates the assembly of the entry pen 24 as the circuit 28 can be inserted into the upper end of the housing 12 and slid along the length axis of the housing 12 until it reaches its mounting position as depicted in FIG. 2. This design is particularly suitable if the coil member is encapsulated in a tube having a protrusion for the return wire. The tube with the coil member can be inserted into the top of the housing 12 and the protrusion can be inserted into a top portion of the groove 30. It can then be slid to its mounting position shown in FIG. 2.

FIG. 3 shows a perspective view of an embodiment of housing 12. The housing 12 in the embodiment of FIG. 3 has a slot or groove 30 that extends along the length axis of the housing 12.

FIG. 4 shows a perspective view of an embodiment of ferrite rod 18 with coil windings 20, wire 34 and return wire 32. For mounting the coil member constituted by the ferrite rod 18 and the coil windings 20 in the housing 12 the ferrite rod 18 is inserted into the opening of the housing 12 and the return wire 32 is inserted into the groove 30 such that the coil member can be slid into the housing 12.

Alternatively the windings 20 are encapsulated, such as in a tube 21, as indicated by the dotted lines in FIG. 4. The tube 21 has a protrusion 23 that covers the return wire 32. In this instance the protrusion 23 rather than the return wire 32 is inserted into the groove 30. As clearly shown in FIG. 4, the protrusion (23) has an outer surface received in the housing groove (30), and an inner surface forming a protrusion inner surface groove that receives and is in direct contact with the return wire (23). Usage of a tube for the coil member has the advantage that a standard tube can be used for a large variety of custom designed entry pens.

Figure 5:
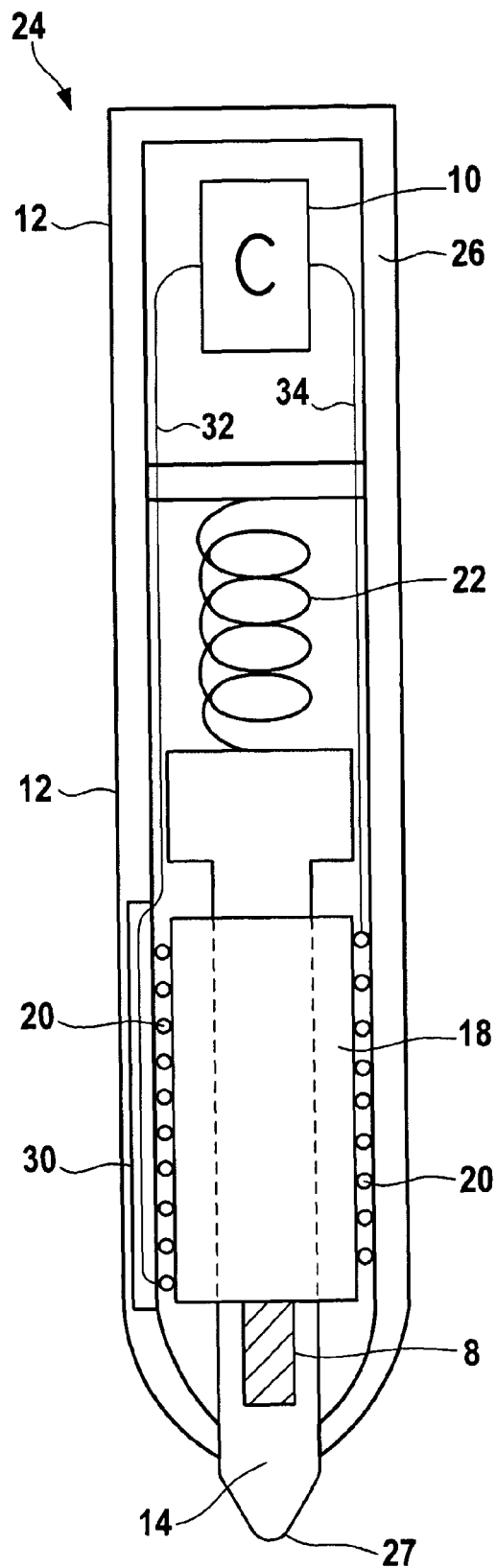
FIG. 5 is a cross-sectional view of a more detailed embodiment of a position pointing device.

FIG. 5 shows a cross-sectional view of a pressure sensitive entry pen 24. The entry pen 24 has a casing or housing 12 having a cylindrical outer body and a core body 14 provided on the axis of the housing 12. In the preferred embodiment considered here the ferrite rod 18 has a through-hole for slideably housing core body 14. The coil windings 20 are wound around the ferrite rod 18.

The moveable magnetic body 8 can move in relation to the core body 14. An elastic body or spring 22 serves to exercise a return force on the core body 14. The core body 14 has a generally cylindrical form, while its upper neighbouring portion which touches the positional detecting plane has a tapered form such that the operation allows it to easily indicate a specified point. Other components such as optionally provided switches are not shown in FIG. 5.

As in the embodiments of the above described Figs. the coil windings 20 are electrically connected to the circuit component 10, such as a capacitor, a battery and/or an analogue or digital or mixed analogue/digital integrated circuit, by a wire 34 and a return wire 32. A portion of the return wire 32 that runs along the ferrite rod 18 is accommodated in the groove 30 that is slightly longer than the longitudinal extension of the ferrite rod 18. Alternatively the groove 30 can extend along the entire length of the housing 12 or to the top portion of the housing 12 for ease of mounting the ferrite rod 18 with the windings 20 in the inside of the housing 12.

The principle of pressure detection operation during the pen-down mode will now be described. The ferrite core 18 is fixed to the pen housing 12. The core body 14 moves backward along its axis by a depressing force when the pen tip 27 is depressed against a positional detecting plane. The moveable magnetic body 8 is positioned to move in conjugation with the core body 14. The relative distance to the ferrite rod 18 is therefore varied as the magnetic body 8 moves. Hence, the inductance of the coil member that is constituted by the ferrite rod 18 and the windings 20 is changed when the pen tip 27 is depressed.

Figure 6:
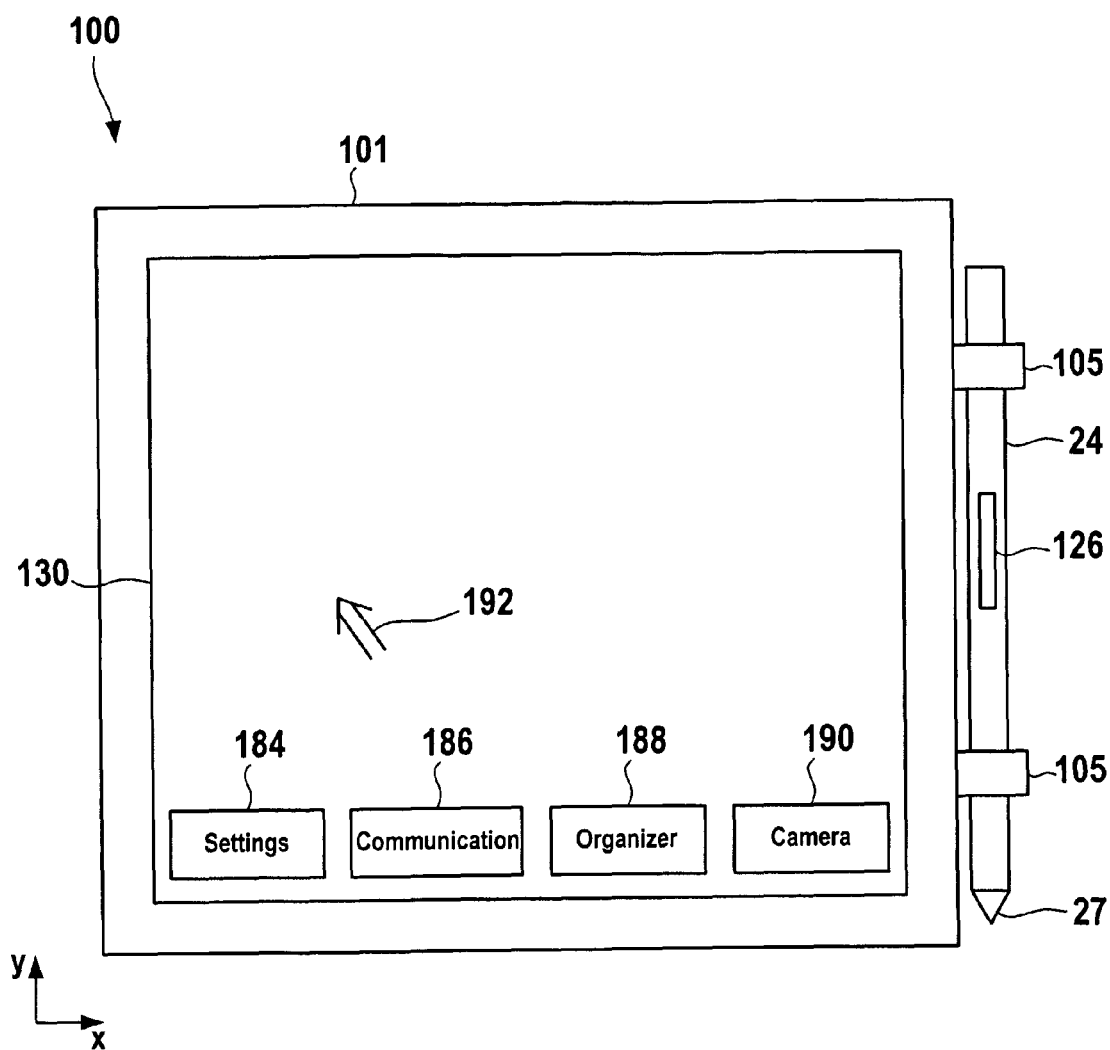
FIG. 6 is a schematic top view of a hand-held electronic appliance having a position pointing device.

FIG. 6 shows an application of the present invention to a hand-held electronic appliance, such as a hand-held smartphone 100.

The smartphone 100 has about the size of a palm and is battery powered. It has a wireless interface to a digital cellular communication network, such as a GSM, UMTS, CDMA, WLAN or other kind of wireless network. By means of the wireless interface a user can make phone calls, send email and/or connect to the Internet.

The smartphone 100 has a housing 101; the housing 101 has clips 104 for receiving entry pen 24. The entry pen 24 has a pen tip 27 and/or a side switch 126.

The entry pen 24 has internal circuitry for generating a signal when the pen tip 27 is depressed and/or when the side switch 126 is operated when the entry pen 24 is in the proximity of the display 130 of the smartphone 100. The entry pen 24 may or may not have a battery for powering its internal circuitry.

Preferably the entry pen 24 includes internal circuitry for electromagnetic coupling with transmission and sensor coils disposed behind the display 130. Electromagnetic coupling has the advantage that the need for a battery within the entry pen 24 can be avoided as the entry pen is powered by the electromagnetic waves it receives from the transmission coils. For example, the entry pen 24 can be designed in accordance with EP0259894 B1 or EP0307667 B1.

It is to be noted that there are various design options to removably attach the entry pen 24 to the housing 101 of the smartphone 100. As an alternative to external attachment of the entry pen 24 by means of the clips 104, the housing 101 may have a reception hole for receiving the entry pen 24 with clips disposed inside the reception hole.

The smartphone 100 has an operating system that provides a graphical user interface such as the Symbian OS, the Palm OS or the Pocket PC Operating System.

The graphical user interface has an icon 184 for entering and/or viewing of user settings, an icon 186 for selecting communication functionalities, such as making a phone call, sending an email and/or connection to the Internet, and icon 188 for access to organiser functionalities, such as entering or viewing a task, a calendar entry, and/or an address, and an icon 190 for access to camera functionalities of the built-in digital camera of the smartphone 100. The graphical user interface of the smartphone 100 may include additional or other icons for access to other functionalities, such as access to the functionalities of a built-in GPS navigation system, a digital photo viewer or the like.

In the preferred embodiment considered here the graphical user interface has a cursor 192; the cursor 192 serves as a pointer for a user's graphic selection of one of the icons 184 to 190 or of another graphical element of the graphical user interface displayed on the display 130.

The cursor 192 can be moved by means of the entry pen 24 without a need to contact the surface of the display 130. In other words, the user orients the pen tip 27 to an xy position within the display 130 without a requirement to contact the surface of the display 130. The orientation of the pen tip 27 is sensed by means of the receiver coils disposed behind the display 130 and the respective position information is entered into the processor of the smartphone 100. In response, the cursor 192 is moved to the position to which the pen tip 128 points. Hence, a user can conveniently move the cursor 192 to any position within display 130 by means of entry pen 24 without a need to touch the surface of the display 130 with the pen tip 128.

Figure 7:
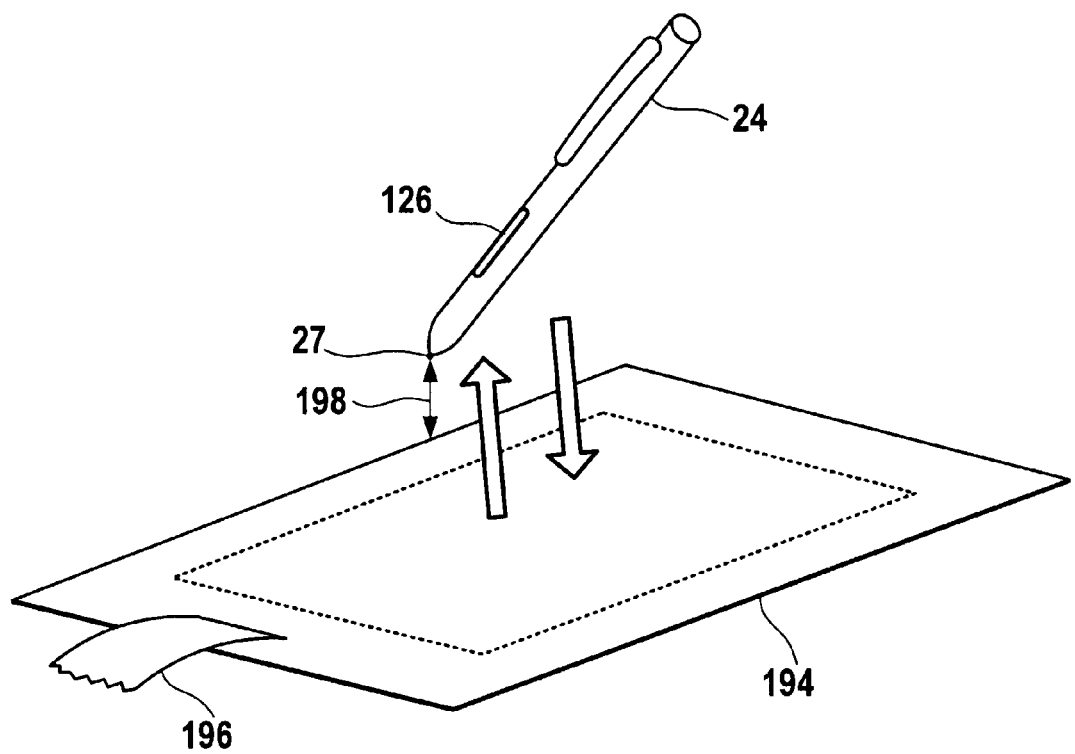
FIG. 7 is a perspective view of a position sensor illustrating electromagnetic coupling between the position sensor and the position pointing device.

The contactless coupling between the entry pen 24 and the transmission and sensor coils disposed behind the display 130 is schematically illustrated in the perspective view of FIG. 7.

A printed circuit board 194 is disposed behind the display 130 (cf. FIG. 6) such that it forms an under layer of the display 130. The printed circuit board 194 carries a sensor unit which extends in the plane, including a transmission coil unit for transmission of position detecting signals for detecting the position of the entry pen 24 relative to the display 130. Further, the printed circuit board 194 has a sensor coil unit for receiving position indicating signals indicating the position of the entry pen 24. The sensor coil unit includes a plurality of sensor coils arranged in the x and y directions.

The printed circuit board 194 has a connector 196 for coupling the printed circuit board 194 to an integrated circuit that controls operation of the position sensing and signal exchange with the entry pen 24 and delivers position data and other data such as pen tip up/down information or information indicative of the pen side switch position.

The electromagnetic coupling between the entry pen 24 and the printed circuit board 194 has a certain contactless user range which enables interaction. For example, the electromagnetic coupling between the entry pen 24 and the printed circuit board 194 is sufficiently strong to sense the entry pen position, if the gap 198 between the pen tip 128 and the printed circuit board 194 is below 30 mm, preferably below 20 mm.

Figure 8:
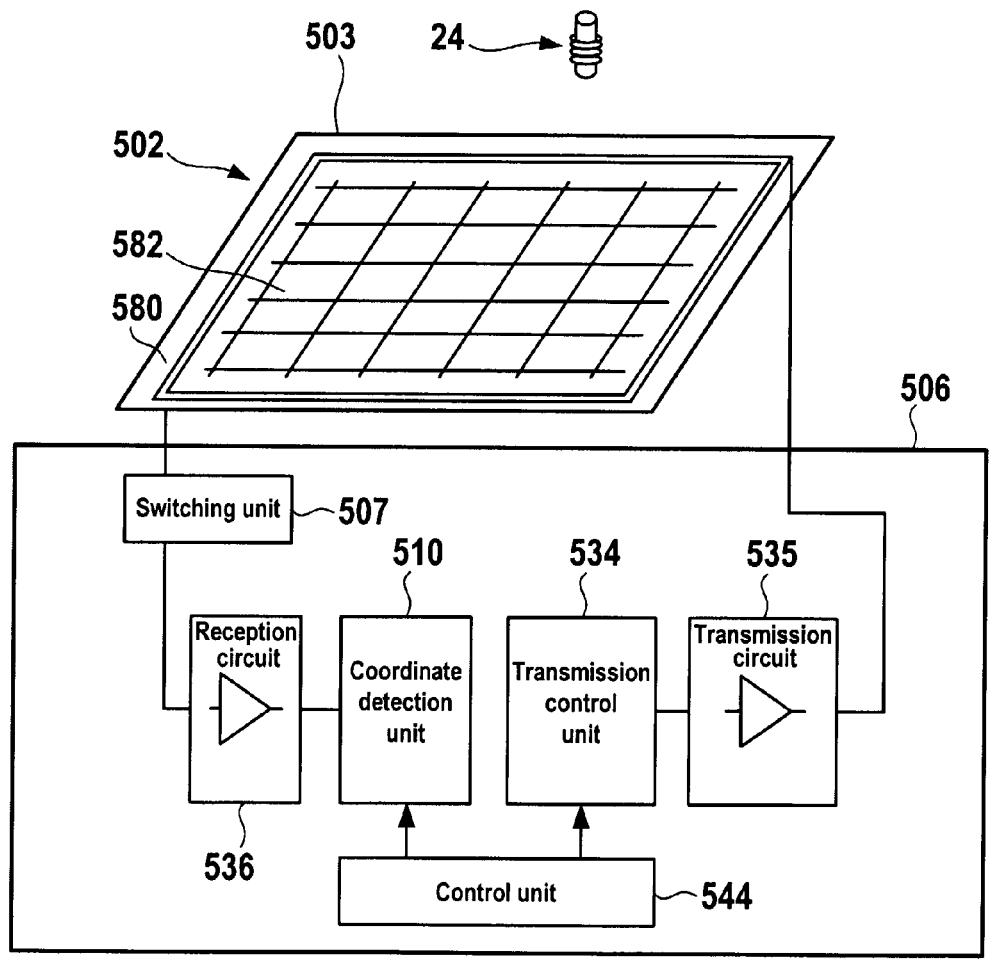
FIG. 8 is a perspective view showing an embodiment of the configuration of the position detecting apparatus of the hand-held electronic appliance of FIG. 6.

FIG. 8 shows an exemplary configuration of the position detecting circuitry that can be used for acquisition of the position data. Elements in the embodiment of FIG. 8 that correspond to elements in the embodiments of FIGS. 1 to 7 are designated by like reference numerals.

The position detecting system according to the preferred embodiment considered here includes an entry pen 24 for indicating a position and a position detecting apparatus 502 for detecting the position of the entry pen 24.

The entry pen 24 includes at least one coil and indicates a position. For example, the entry pen 24 includes a coil and a circuit component connected to the coil, such as a capacitor for forming a resonant circuit with the coil. Preferably, the entry pen 24 includes additional circuitry for generating an electromagnetic signal when the user performs a user input action, such as operating the switch of the entry pen 24.

The position detecting apparatus 502 includes a control unit 544, a transmission control unit 534 for generating position detecting signals, a transmission circuit 535, a sensor unit 503 serving as a sensor area, a switching unit 507 for selecting/switching sensor coils, a reception circuit 536 and a coordinate detection unit 510.

The sensor unit 503, which extends in the plane, includes a transmission coil unit 580 for transmitting position detecting signals for detecting the position of the entry pen 24; and a sensor coil unit 582 for receiving position indicating signals indicating the position of the entry pen 24. The sensor coil unit 582 includes a plurality of sensor coils arranged in the x-direction (x-direction sensor coils) and a plurality of sensor coils arranged in the y-direction orthogonal to the x-direction (y-direction sensor coils).

The control unit 544 corresponds to the signal transmitting unit, the receiving unit and the position detecting unit; the transmission control unit 534 and the transmission circuit 535 correspond to the signal transmitting unit; the switching unit 507 and the reception circuit 536 correspond to the receiving unit; and the coordinator detection unit 510 corresponds to the position detection unit.

The control unit 544 controls the position detecting apparatus 502 and also controls the transmission control unit 534, the switching unit 507, the reception circuit 536 and the coordinator detection unit 510.

The transmission control unit 534 generates position detecting signals for detecting a position indicated by the entry pen 24 under the control of the control unit 544. The transmission circuit 535 amplifies the position detecting signals from the transmission control unit 534 and supplies the position detecting signals to the transmission coil unit 580, which is provided in the sensor unit 503. Accordingly, the transmission coil unit is driven. The sensor coils are scanned using the switching unit 507 and the reception circuit 536 for position detection by coordinate detection unit 510.

In addition the sensor coils can serve for reception of the electromagnetic signal that is emitted by the entry pen 24 when the user performs the user input action, such as operating a switch of the entry pen 24 (cf. side switch 126 or pen tip 27). The respective user entry signal is provided as part of the position dataset to the host processors. In response, the graphical user interface signals entry of the graphically selected menu item which causes a respective entry of a user setting or invokes a certain functionality.

The various components that are required for controlling a driving operation of the position sensor 502 are provided by a mixed analogue/digital application specific integrated circuit 506.

LIST OF REFERENCE NUMERALS

8 Magnetic body
10 Circuit component
12 Housing
14 Core body
18 Ferrite rod
20 Coil winding
21 Tube
22 Spring
23 Protrusion
24 Entry pen
26 Housing wall
27 Pen tip
28 circuit
30 Groove
32 Return wire
34 Wire
100 Smartphone
101 Housing
105 Clips
126 Side switch
130 Display
184 Icon
186 Icon
188 Icon
190 Icon
192 Cursor
194 Printed circuit board
195 Sub-menu
196 Connector
197 Context menu
198 Gap
199 Arrow symbol
502 Position detecting apparatus
503 Sensor unit
506 Integrated circuit
507 Switching unit
510 Coordinate detection unit
534 Transmission control unit
535 Transmission circuit
536 Reception circuit
544 Control unit
580 Transmission coil unit
582 Sensor coil unit

The invention claimed is:

1. A hand-held electronic appliance comprising:
a position detecting apparatus (194, 196; 502, 506);
a position pointing device (24) for use with the position detecting apparatus comprising a housing (12) for receiving a circuit, the circuit being formed as a modular unit having a coil member (18, 20), a magnetic core body (8, 14), a return wire (32) and a circuit component (10), the return wire (32) electrically connecting the coil member (18, 20) to the circuit component for delivering an electrical signal that changes a frequency of the circuit, the housing having a housing inner surface with a housing groove (30), the coil member and the return wire being encapsulated by an encapsulation (21), the encapsulation (21) having a protrusion (23) for covering and encapsulating the return wire between a first coil and a last coil of said coil member, the protrusion having an outer surface received in the housing groove (30), which extends from a terminal end of the housing to a first location within the housing such that the modular unit is slidingly disposed into said housing from said terminal end toward said first location, said protrusion (23) further having an inner surface forming a protrusion inner surface groove that receives and is in direct contact with the return wire (23); and
means (105) for releaseably attaching the position pointing device to the hand-held electronic appliance.

2. The hand-held electronic appliance of claim 1, the means for releaseably attaching the position pointing device comprising at least one clip (105).

3. The hand-held electronic appliance of claim 1, the means for releaseably attaching the position pointing device comprising a reception hole.

4. The hand-held electronic appliance of claim 3, the reception hole being formed in a housing (101) of the hand-held electronic appliance.

5. The hand-held electronic appliance of claim 1, further comprising a display unit (130), the position detecting apparatus comprising means (502) for emitting electromagnetic radiation and for receiving electromagnetic return radiation from the position pointing device, the means for emitting and receiving the electromagnetic radiation being located behind the display unit.

6. A position pointing device comprising:
a housing (12) for receiving a circuit (28), the circuit being formed as a modular unit having a coil member (18, 20), a magnetic core body (8, 14), a return wire (32) and a circuit component (10), the coil member and the circuit component (10) being electrically connected by a return wire (32) for delivering an electrical signal that changes a frequency of the circuit, the coil member and the return wire being encapsulated by an encapsulation (21), the encapsulation (21) having a protrusion (23) for covering the return wire between a first coil and a last coil of said coil member, the housing having a housing inner surface, the housing inner surface having a housing groove (30) for receiving at least a portion of the protrusion, wherein both said encapsulation and said housing completely circumscribe said return wire, wherein the modular unit is sliding disposed along the housing groove into the housing from a terminal end of the housing into an interior of the housing, wherein the protrusion (23) has an outer surface received in the housing groove, and wherein the protrusion (23) further has an inner surface forming a protrusion inner surface groove that receives and is in direct contact with the return wire (23).

7. A position pointing device comprising:
a housing (12) for slidingly receiving a circuit (28), the circuit having a coil member (18, 20), a magnetic core body (8, 14), a return wire (32) and a circuit component (10), the coil member having a return wire (32) for forming a connection with the circuit component for delivering an electrical signal that changes a frequency of the circuit, the housing having a housing inner surface, the housing inner surface having a housing groove (30) extending to a terminal end of said housing for receiving a protrusion due to the return wire,
wherein the housing groove (30) extends at least from a terminal end of the housing to a furthermost edge of a mounting position of the protrusion, said groove extending by a length longer than the protrusion,
wherein said circuit forms a modular unit that may be selectively disposed into said housing by sliding said circuit from said terminal end until it reaches the furthermost edge, and
wherein the coil member and the return wire are encapsulated by an encapsulation (21), the encapsulation (21) having a protrusion (23) for covering the return wire between a first coil and a last coil of said coil member, the protrusion (23) having an outer surface received in the housing groove, the protrusion (23) further having an inner surface forming a protrusion inner surface groove that receives and is in direct contact with the return wire (23).

8. The position pointing device of claim 7, wherein the protrusion due to the return wire on the coil extends from the furthermost edge of the coil to the circuit located near the terminal end of the housing.

* * * * *

UNITED STATES PATENT AND TRADEMARK OFFICE
CERTIFICATE OF CORRECTION

PATENT NO.         : 8,723,842 B2  
APPLICATION NO.    : 11/885401  
DATED              : May 13, 2014  
INVENTOR(S)        : Kaneda et al.

Page 1 of 1

It is certified that error appears in the above-identified patent and that said Letters Patent is hereby corrected as shown below:

On the Title Page

Change Item "(22) PCT Filed: Jan. 3, 2005" to read --(22) PCT Filed: March 1, 2005--.

Signed and Sealed this  
Fifth Day of August, 2014

Michelle K. Lee  
*Deputy Director of the United States Patent and Trademark Office*